United States Patent
Hirabayashi

(10) Patent No.: US 10,038,350 B2
(45) Date of Patent: Jul. 31, 2018

(54) DC MOTOR

(71) Applicant: DENSO CORPORATION, Kariya, Aichi-pref. (JP)

(72) Inventor: Takashi Hirabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 213 days.

(21) Appl. No.: 15/201,827

(22) Filed: Jul. 5, 2016

(65) Prior Publication Data

US 2017/0005540 A1 Jan. 5, 2017

(30) Foreign Application Priority Data

Jul. 3, 2015 (JP) ................................. 2015-134400

(51) Int. Cl.
| | | |
|---|---|---|
| *H02K 5/22* | (2006.01) | |
| *H02K 5/14* | (2006.01) | |
| *H02K 11/40* | (2016.01) | |
| *H02K 7/20* | (2006.01) | |

(52) U.S. Cl.
CPC ............ *H02K 5/143* (2013.01); *H02K 5/225* (2013.01); *H02K 11/40* (2016.01); *H02K 7/20* (2013.01)

(58) Field of Classification Search
CPC ....... H02K 5/143; H01R 39/385; H01R 39/38
USPC ....................................................... 310/239
See application file for complete search history.

(56) References Cited

U.S. PATENT DOCUMENTS

| | | | | |
|---|---|---|---|---|
| 4,926,075 A | * | 5/1990 | Fushiya | H01R 39/36 29/596 |
| 5,648,695 A | * | 7/1997 | Yamaguchi | H01R 39/40 310/239 |
| 5,939,812 A | * | 8/1999 | Wetzel | B60T 8/4022 310/239 |
| 7,256,527 B2 | * | 8/2007 | Niimi | H01R 39/385 310/239 |
| 7,592,731 B2 | * | 9/2009 | Niimi | H02K 23/26 310/198 |
| 8,427,027 B2 | * | 4/2013 | Grabner | H01R 39/383 310/239 |
| 2003/0111930 A1 | * | 6/2003 | Vacheron | H01R 39/385 310/239 |
| 2007/0126311 A1 | * | 6/2007 | Acosta | H01R 39/381 310/239 |
| 2008/0084124 A1 | * | 4/2008 | Golab | H01R 39/385 310/43 |

(Continued)

FOREIGN PATENT DOCUMENTS

JP         2003-189551 A         7/2003

*Primary Examiner* — Terrance Kenerly
(74) *Attorney, Agent, or Firm* — Oliff PLC

(57) ABSTRACT

A positive connection plate of a DC motor includes a fitting groove to enable assembling a specific brush holder thereto. The specific brush holder includes a convex part that fits in the fitting groove and a stepped surface having a step at a radially outer side of the convex part, and located at the opposite-core side of its armature from a core-side end surface of the convex part. A space existing in an axial stepped area which is located at the core side from the stepped surface and in which the step is formed is a stepped space. A drawing member is drawn from a position which circumferentially overlaps with the specific brush holder to the outside of a motor case, and is disposed so as to overlap with the stepped space in the axial direction.

16 Claims, 14 Drawing Sheets

(56) References Cited

U.S. PATENT DOCUMENTS

| | | | |
|---|---|---|---|
| 2008/0084133 A1* | 4/2008 | Burton | H01R 39/26 310/239 |
| 2008/0122303 A1* | 5/2008 | Santo | H02K 5/148 310/51 |
| 2014/0159527 A1* | 6/2014 | Kawashima | H02K 23/04 310/148 |
| 2017/0162993 A1* | 6/2017 | Yoshida | H01R 39/381 |

* cited by examiner

CORE SIDE ←——→ OPPOSITE-CORE SIDE

CORE SIDE ←――――→ OPPOSITE-CORE SIDE

CORE SIDE ⟵⟶ OPPOSITE-CORE SIDE

DC MOTOR

This application claims priority to Japanese Patent Application No. 2015-134400 filed on Jul. 3, 2015, the entire contents of which are hereby incorporated by reference.

BACKGROUND OF THE INVENTION

1. Field of the Invention

The present invention relates to a DC motor.

2. Description of Related Art

There is known a 6-pole DC motor for a starter, in which the field pole is comprised of permanent magnets. Generally, such a motor employs a wave-winding structure for an armature coil, and a 4-brush structure including two positive brushes and two negative brushes. As shown, for example, in Japanese Patent Application Laid-open No. 2003-189551, in such a motor, a lead wire connected to the positive brushes and drawn to the outside of the motor case thereof is disposed at substantially a middle position of the two positive brushes.

Meanwhile, some starters used for a vehicle have an idling stop function and accordingly are required to have a long life employ a 6-brush structure including three positive brushes and three negative brushes. Generally, in such a 6-brush structure, the lead cable is disposed between one of the positive brushes and one of the negative brushes which are adjacent to each other. The lead wire drawing position (the positon position at which the lead wire is disposed) of the DC motor employing the 6-brush structure is different from that in the DC motor employing the 4-brush structure. Accordingly, the same motor case cannot be shared between the 4-brush structure and the 6-brush structure.

In addition, to adjust the lead wire drawing position of the 6-brush structure to be the same as the lead wire drawing position of the 4-brush structure, since the lead wire drawing position circumferentially overlaps with the position of one of the negative brushes and accordingly a space for disposing therein the lead wire on the core side in the axial direction of the negative brushes is required, the overall motor length has to be increased.

SUMMARY

An exemplary embodiment provides a DC motor including:

a cylindrical commutator mounted on a shaft of an armature;

brushes disposed on an outer circumference of the commutator;

brush springs disposed on an opposite-commutator side of the brushes for pressing the brushes toward the commutator;

brush holders holding the brushes at an inner side in a radial direction perpendicular to a center axis of the commutator and holding the brush springs at the opposite-commutator side of the brushes;

a positive connection plate made of conductive material and disposed at a core side of the commutator from the brush holders in an axial direction of the commutator, the positive connection plate being electrically connected with positive brushes of the brushes through pigtails;

a negative connection plate made of conductive material and disposed at an opposite-core side of the armature from the brush holders in the axial direction, the negative connection plate being electrically connected with negative brushes of the brushes through pigtails; and a drawing member electrically connected to the positive connection plate at a first end part thereof as a junction part, a second end part of the drawing member being drawn to an outside of a motor case of the DC motor, wherein one of the brush holders holding the negative brushes is a specific brush holder, the positive connection plate includes a fitting groove to enable assembling the specific brush holder thereto, the specific brush holder includes a convex part that fits in the fitting groove and a stepped surface having a step at a radially outer side of the convex part, and located at the opposite-core side from a core-side end surface of the convex part, a space existing in an axial stepped area which is located at the core side from the stepped surface and in which the step is formed is a stepped space, and the drawing member is drawn from a position which circumferentially overlaps with the specific brush holder to the outside of the motor case, and is disposed so as to overlap with the stepped space in the axial direction.

According to the exemplary embodiment, there is provided a DC motor in which the drawing position of the lead wire can be set to be the same for the 6-brush structure and the 4-brush structure without increasing the overall length of the DC motor to thereby enable the motor case for 6-brush structure and the 4-brush structure to share a common design.

Other advantages and features of the invention will become apparent from the following description including the drawings and claims.

PREFERRED EMBODIMENTS OF THE INVENTION

First Embodiment

Figure 1:
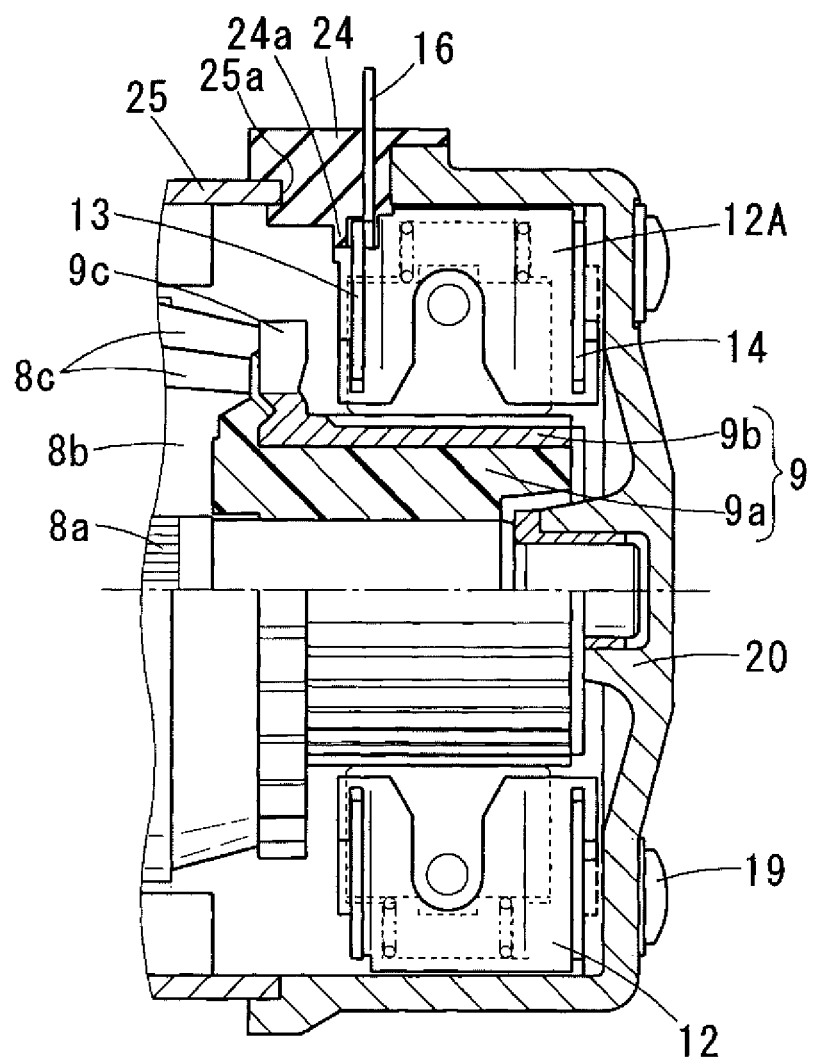
FIG. 1 is a cross-sectional view of a rear part of a DC motor according to a first embodiment of the invention.
Figure 5:
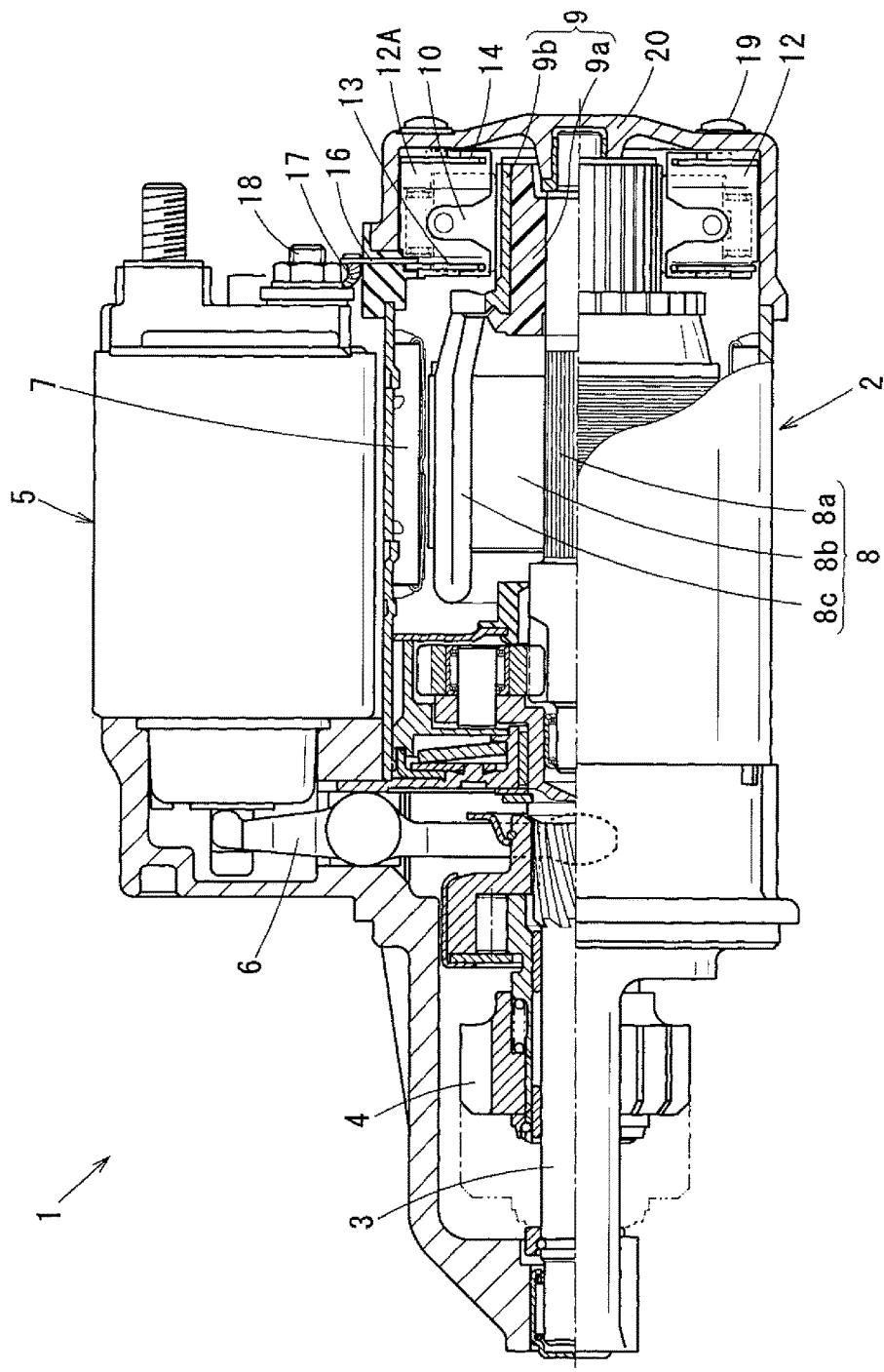
FIG. 5 is a cross-sectional view of a starter including the DC motor according to the first embodiment of invention.

FIG. 1 is a cross-sectional view of a rear part of a DC motor 2 according to a first embodiment of the invention. The DC motor 2 is for use in a starter 1 shown in FIG. 5. As shown in FIG. 5, the starter 1 includes an output shaft 3 driven to rotate by the motor 2, a pinion 4 mounted on the shaft 3, a lever 6 and an electromagnetic switch 5. The starter 1 is of the so-called "pinion-enmeshing type" in which the lever 6 is driven by the attraction force of the electromagnetic switch 5 to push out the pinion 4 toward a not-shown ring gear of an engine (toward the left side of FIG. 5). Since the structure of the starter of the pinion-enmeshing type is well known, the motor 2 is described in detail in the following.

The motor 2 includes a field pole member comprised of a permanent magnet 7, an armature 8 rotatably disposed within the inner circumference of the field pole member, a cylindrical commutator 9 mounted on the shaft of the armature 8, and brushes 10 disposed at the outer circumference of the commutator 9. The commutator 9 includes a cylindrical insulator base 9a made of resin material, for example, and commutator segments 9b held by the insulator base 9a so as to be arranged in a cylindrical form. The insulator base 9a is press-fitted onto the outer circumference of one end of the armature shaft 8a. As shown in FIG. 1, the commutator segments 9b are insulated from one another by the insulator base 9a, and each armature coil 8c is connected to a riser 9c disposed at the axial end of the corresponding commutator segment 9b on the side of an armature core 8b. In the following, the "core side" means the side facing the armature core 8b in the axial direction (the left side of FIG. 1), and the "opposite-core side" means the side opposite to the armature core 8b in the axial direction.

Figure 2:
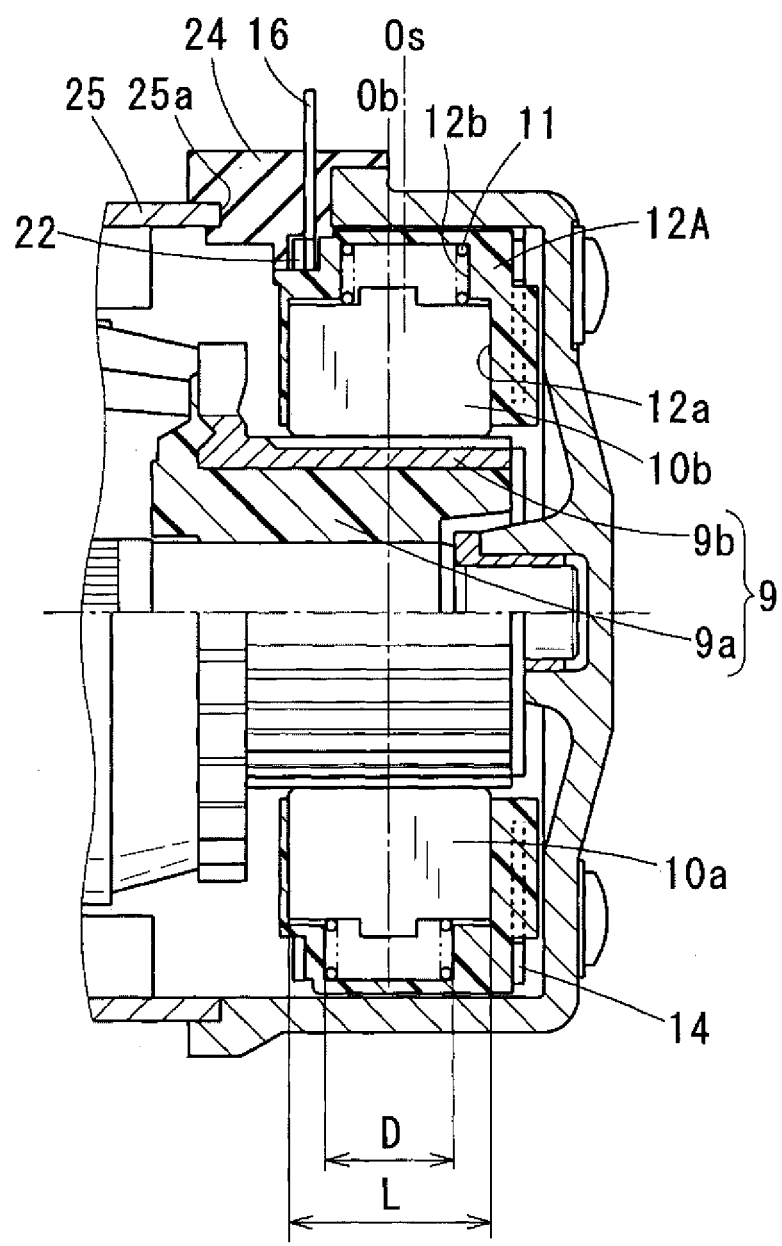
FIG. 2 is a cross-sectional view showing brush holders included in the DC motor according to the first embodiment of the invention.
Figure 3:
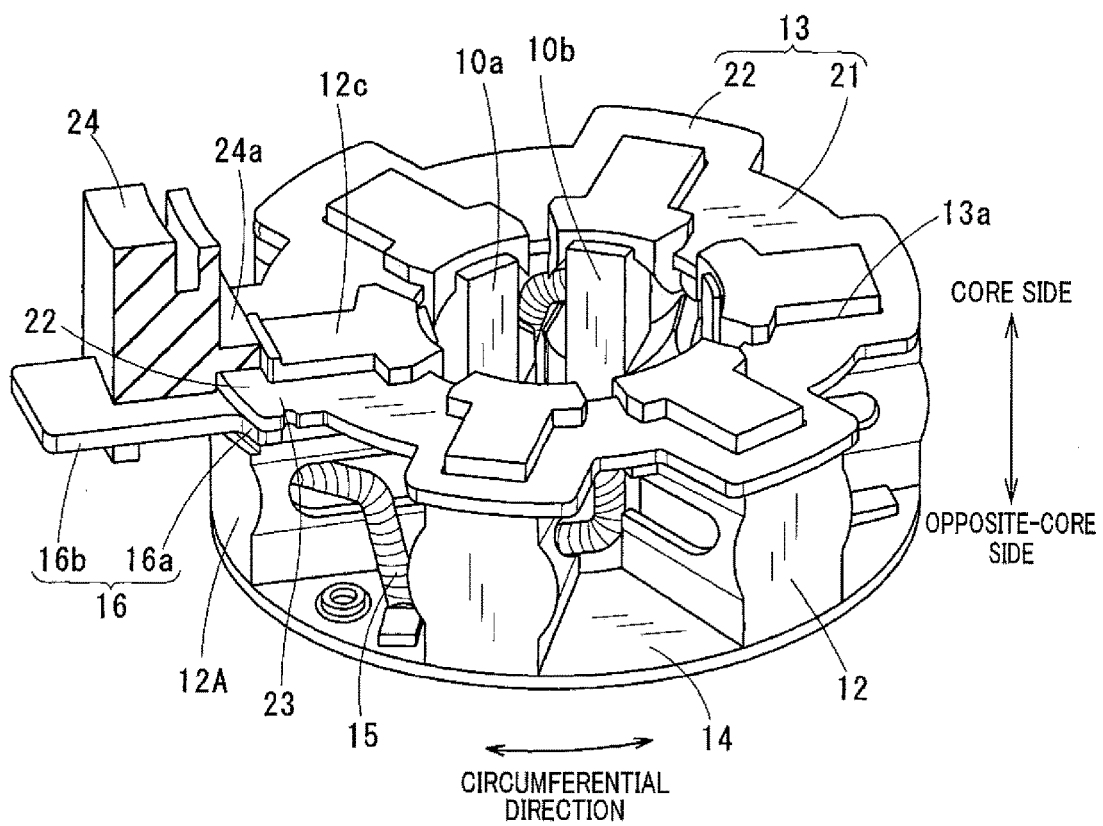
FIG. 3 is a perspective view of a brush assembly included in the DC motor according to the first embodiment of the invention.
Figure 4:
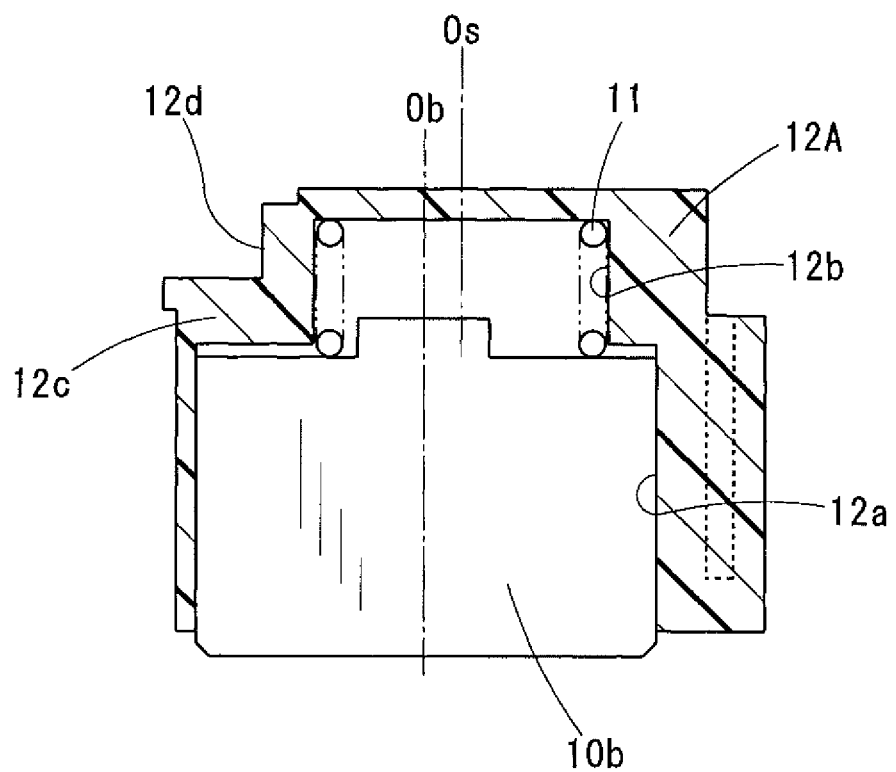
FIG. 4 is an enlarged cross-sectional view of one of the brush holders included in the brush assembly of the DC motor according to the first embodiment of the invention.

As shown in FIG. 3, the brushes 10 includes three positive brushes 10a and negative brushes 10b which are arranged alternately along the circumference of the commutator 9. The brushes 10 constitute a brush assembly together with brush springs 11, brush holders 12 and a pair of connection plates 13 and 14. As shown in FIG. 2, the brush springs 11 are disposed on the opposite-commutator side of the brushes 10 and press the brushes 10 against the commutator 9. The axial dimension (spring outer diameter D) of the brush spring 11 is smaller than the axial length L of the brush 10. As shown in FIG. 4, the brush spring 11 housed in a later explained specific brush holder 12A (a specific one of the brush holders 12) is disposed such that the axial center Os thereof is offset to the opposite-core side from the axial center Ob of the corresponding brush 10.

The brush holders 12 are made of insulation material such as resin and formed in a box shape. As shown in FIG. 2, each brush holder 12 includes a brush housing chamber 12a disposed inwardly in the radial direction perpendicular to the axial center of the commutator 9 and housing therein the brush 10, and a spring housing chamber 12b disposed outwardly in the radial direction and housing therein the brush spring 11. Each brush holder 12 is formed with an insertion hole to enable inserting the brush spring 11 and the brush 10 at its inner circumference. Each brush holder 12 is formed with a wall surface that closes the outer circumference of the spring housing chamber 12b, and regulates the radial position of the brush spring 11. The brush housing chamber 12a and the spring housing chamber 12b of the specific brush holder 12A are formed so as to satisfy the above described positional relationship between the axial center Ob of the brush 10 and the axial center Os of the brush spring 11. That is, the spring housing chamber 12b is formed smaller in axial length than the brush housing chamber 12a, and the axial center of the spring housing chamber 12b is offset toward the opposite-core side from the axial center of the brush housing chamber 12a.

The connection plates 13 and 14, which are made of steel in this embodiment, are formed in a shape of a ring the diameter of whose center hole is larger than the outer diameter of the commutator 9. The connection plates 13 and 14 are disposed along the direction perpendicular to the axial center of the commutator 9. As shown in FIG. 3, the connection plate 13 is electrically connected with the three positive brushes 10a through pigtails 15, and the connection plate 14 is electrically connected with the three negative brushes 10b through pigtails 15. In the following, the connection plate 13 and the connection plate 14 may be referred to as the positive connection plate 13 and the negative connection plate 14, respectively. The positive connection plate 13 and the negative connection plate are electrically isolated from each other and disposed side by side with the six brush holders 12 therebetween. As shown in FIG. 5, the positive connection plate 13 is disposed on the core side with respect to the brush holders 12, and electrically connected to an M-terminal bolt 18 of the electromagnetic switch 5 through a drawing member 16 and a motor lead 17. The negative connection plate 14 is disposed on the opposite-core side with respect to the brush holders 12, and fixed and electrically connected to an end frame 20 by screws 19.

As shown in FIG. 3, the positive connection plate 13 is formed with six fitting grooves 13a at its perimeter for assembling of the brush holders 12. The positive connection plate 13 is also formed with crossover parts 22 each of which connects corresponding two of six plate parts 21 which are circumferentially adjacent to each other across the fitting groove 13a. Each fitting groove 13a opens to the radially inner circumference of the positive connection plate 13 and extends toward the radially outer circumference of the positive connection plate 13. Of the six plate parts 21, every three other plate parts 21 are respectively connected with the pigtails 15 of the positive brushes 10a at their surfaces on the opposite-core side. The crossover parts 22 are flush with the plate parts 21 and extend so as to detour around the outer circumferences of the fitting grooves 13a. Each crossover part 22 connects to the outer circumferences of the adjacent plate parts 21 at both circumferential ends thereof.

Next, the core-side shape of the brush holders 12 assembled to the positive plate 13 is explained. As shown in FIG. 3, the brush holder 12 includes a convex part 12c formed at the core side thereof, which fits in the fitting groove 13a of the positive plate 13. The convex part 12c is inserted from the inner circumference of the positive connection plate 13 and fitted in the fitting groove 13a when the brush holder 12 is assembled to the positive connection plate 13. As shown in FIG. 4, the brush holder 12 includes a stepped surface 12d formed radially outward of the convex part 12c at both circumferential ends. The stepped surface 12d is stepped in the axial direction and is located on the opposite-core side from the core side end surface of the convex part 12c. The opposite core-side shape of the brush holder 12 may be the same as the above explained core-side shape. That is, the brush holder 12 may include a convex part formed at the opposite-core side thereof which is fitted in a fitting groove formed in the negative connection plate from the inner circumference of the negative connection plate.

Next, the connection structure between the drawing member 16 and the positive connection plate 13 is explained. One of the three brush holders 12 each holding the negative brush 10*b* is referred to as the specific brush holder 12A (see FIG. 3). The space with a step along the axial direction on the core side formed by the stepped surface 12*a* of the specific brush holder 12A is referred to as the stepped space. As shown in FIG. 3, the crossover part 22 is disposed in the stepped space in a state where the convex part 12*c* of the specific brush holder 12A is fitted in the fitting groove 13*a*. That is, in the specific brush holder 12A, the convex part 12*c* is fitted in the fitting groove 13*a* in a state where the core-side end surface of the convex part 12*c* projects from the positive connection plate 13 toward the core. The positive connection plate 13 is provided with a later-explained fusion part 23 at the cross part 22. The cross-sectional area of the cross part 22 becomes minimum at this fusion part 23.

The drawing member 16 is a plate-like member made of material (copper, for example) whose resistance is lower than that of the positive connection plate 13. The drawing member 16 is disposed such that both its main surfaces are perpendicular to the axial center of the commutator 9. The drawing member 16 includes a joint part 16*a* at one end part thereof. The junction part 16*a* is joined to the opposite-core side surface of the crossover part 22. The other end part of the drawing member 16 is drawn to the outside of the motor case 25 through a grommet 24. That is, the drawing member 16 is drawn from a position that circumferentially overlaps with the specific brush holder 12A to the outside of the motor case 25, and is disposed so as to axially overlap with the stepped space. As shown in FIG. 5, the drawing member 16 is connected with one end of the motor lead 17 which is fitted to the M-terminal bolt 18 of the electromagnetic switch 5. As shown in FIGS. 1 and 2, the grommet 24 as an insulating member made of rubber is fitted to a drawing groove 25*a* formed in the motor case 25 so as to hold the outer circumference of the drawing member 16 for insulation with the motor case 25. As shown in FIG. 3, the grommet 24 is formed with a core side projection 24*a* which projects radially inwardly. The core side projection 24*a* covers substantially the whole of the core side of the crossover part 22.

Here, the part on the other end side from the junction part 16*a* of the drawing member 16 is referred to as a plate-like drawing part 16*b*. The circumferential width of the junction part 16*a* is larger than that of the plate-like drawing part 16*b*. That is, the junction part 16*a* is formed such that its end part on the side of one end of the drawing member 16 extends toward both circumferential ends beyond the plate-like drawing part 16*b*, and its circumferential width is larger than that of the fitting groove 13*a*. Therefore, the junction part 16*a* is joined to the crossover part 22 at an area whose circumferential width is larger than that of the fitting groove 13*a*. The fusion part 23 of the positive connection plate 13 is provided at two different positions at the side where its voltage is lower than the voltage of the junction portion between the crossover part 22 and the junction part 16*a*. Specifically, as shown in FIG. 3, the fusion part 23 is provided between a portion which connects to the plate section 21 and the junction portion between the crossover part 22 and the junction part 16*a*.

The first embodiment described above provides the following advantages.

1) In the motor 2 of the first embodiment, there is formed a step between the stepped surface 12*d* and the core side end surface of the convex part 12*c* provided on the core side of the specific brush holder 12A. The drawing member 16 is disposed in the space formed in the axial direction by this step (stepped space). That is, since the drawing member 16 is drawn from the position that circumferentially overlaps with the specific brush holder 12A to the outside of the motor case 25, the drawing position can be set to be the same for the 6-brush structure and the 4-brush structure, and accordingly, the motor case 25 can be commonalized between the 6-brush structure and the 4-brush structure.

2) The drawing member 16 is a plate-like member, and is disposed such that both its main surfaces are perpendicular to the axial center of the commutator 9, and so as to be housed within the stepped space in the axial direction (which may be referred to as the "axial stepped area" hereinafter). That is, the drawing member 16 is disposed within the axial stepped area without projecting to the core side from the convex part 12*c*. Accordingly, when the drawing position for the 6-brush structure is set to be the same as that of the 4-brush structure, since it is not necessary to ensure a space to dispose the drawing member 16 therein on the core side from the specific brush holder 12A, the motor 2 can be made compact in the axial direction for that.

3) The brush spring 11 is housed in the specific brush holder 12A such that the axial center Os thereof is offset toward the opposite-core side from the axial center Ob of the brush 10. Accordingly, the step formed between the core side end surface of the convex part 12*c* and the stepped surface 12*d* can be made sufficiently large. As a result, since the axial stepped area can be set large, and accordingly the degree of freedom of placement of the drawing member 16 can be made high, the motor 2 can be made compact in the axial direction.

4) The junction part 16*a* is larger in circumferential width than the plate-like drawing part 16*c* and the fitting groove 13*a* formed in the positive connection plate 13. Accordingly, the junction part 16*a* can be joined to the crossover part 22 at an area sufficiently large in circumferential width. As a result, since a sufficiently large junction area can be ensured without increasing the radial dimensions of the junction part 16*a* and the crossover part 22, the motor 2 can be made compact in the radial direction.

5) Since the brush holders 12 are made of insulating material, it is not necessary to dispose any component for insulation between the drawing member 16 and the specific brush holder 12A. Accordingly, the manufacturing cost can be reduced for that.

6) The drawing member 16 is made of material that is lower in resistance than that of the positive connection plate 13. Accordingly, since the heat generated in use can be reduced, the drawing member 16 can be made compact in size.

7) The crossover part 22 of the positive connection part 13 is formed with the fusion part 23 at which the cross-sectional area becomes minimum. Accordingly, if an unexpected large current occurs in the motor 2, the motor 2 can be protected because the fusion part 23 is fused. When the fusion part 23 is fused, its temperature highly increases. Accordingly, the distance between the fusion part 23 and the grommet 24 has to be sufficiently large. In the first embodiment, the fusion part 23 is provided between the portion which connects to the plate part 21 and the junction portion between the crossover part 22 and the junction part 16*a*. That is, since the fusion part 23 is provided radially inward from the radial position of the junction part 16*a*, the distance between the fusion part 23 and the grommet 24 can be set large. Accordingly, since a space for reducing the effect of the high temperature that occurs when the fusion part 23 is fused can be made small, the motor 2 can be made compact in the radial direction.

8) The core side projection 24a provided in the grommet 24 projects radially inward to coves substantially the whole of the core side of the crossover part 22. Accordingly, even if a piece of conductive material enters the inside of the motor 2, it is possible to prevent the piece from contacting a part which is higher in voltage than the fusion part 23. Accordingly, if an unexpected large current occurs in the motor 2 due to the piece, the motor 2 can be protected since the fusion part 23 is fused immediately.

Next, other embodiments of the invention are described below.

In the embodiments described below, the parts or components which are the same as or equivalent to those described in the first embodiment are indicated by the same reference characters or numerals.

Second Embodiment

Figure 6:
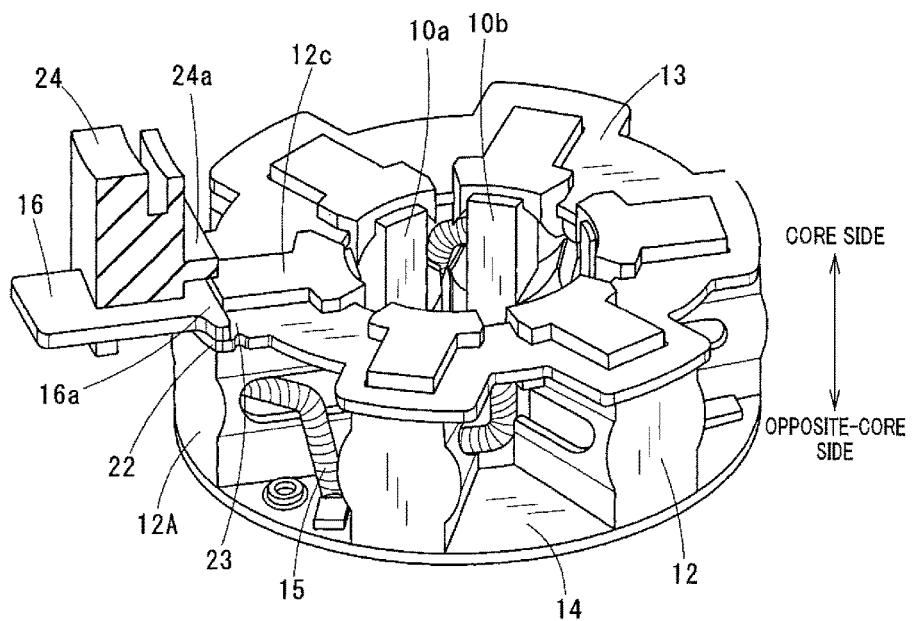
FIG. 6 is a perspective view of a brush assembly of a DC motor according to a second embodiment of the invention.

A second embodiment of the invention is described with reference to FIG. 6. As shown in FIG. 6, in the second embodiment, the axial center Os of the brush spring 11 housed in the specific brush holder 12A is not offset to the opposite-core side from the axial center Ob of the brush 10, and the junction part 16a is joined to the core side surface of the crossover part 22. Accordingly, since the junction part 16a does not project to the core side from the stepped surface, and therefore the junction part 16a can be disposed within the axial stepped area, advantages similar to the advantages provided by the first embodiment can be obtained.

Third Embodiment

Figure 7:
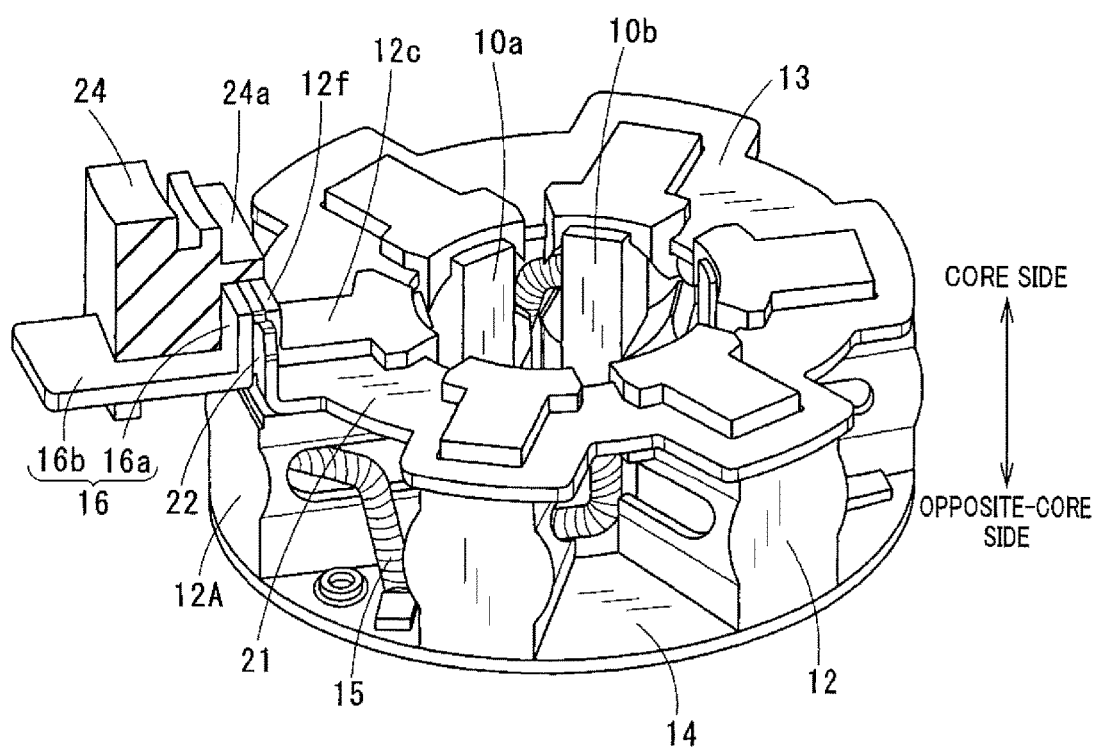
FIG. 7 is a perspective view of a brush assembly of a DC motor according to a third embodiment of the invention.
Figure 8:
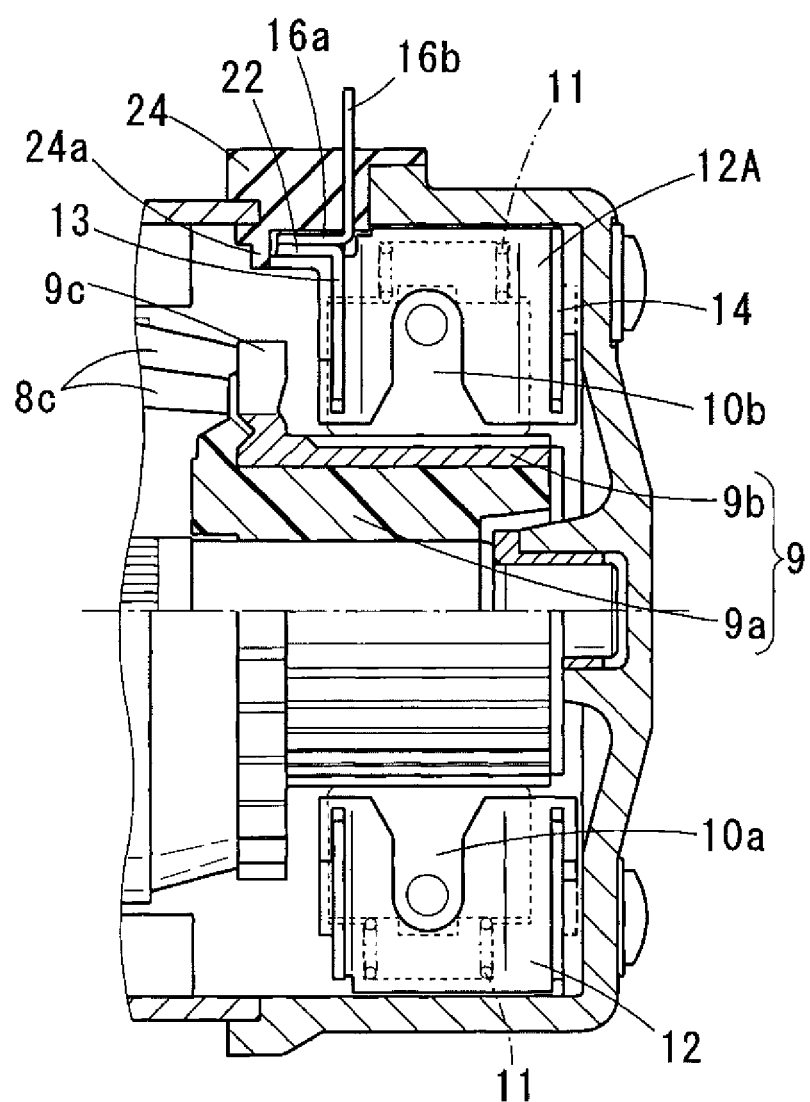
FIG. 8 is a cross-sectional view of a rear part of the DC motor according to the third embodiment of the invention.

Next, a third embodiment of the invention is described. In the third embodiment, the crossover part 22 of the positive connection plate 13 is joined to the junction part 16a of the drawing member 16 such that they are radially opposed to each other. As shown in FIG. 7, in this embodiment, the crossover part 22, which is disposed at a position that circumferentially overlaps with the specific brush holder 12A, is bent at substantially a right angle to the core side from the plate part 21. As shown in FIG. 8, the drawing member 16 is disposed such that the both major surfaces of the plate-like drawing part 16b are perpendicular to the center axis of the commutator 9 as in the case of the first embodiment, and the junction part 16b is bent to the core side from the plate-like drawing part 16b and joined to the radially outer surface of the crossover part 22.

Figure 9:
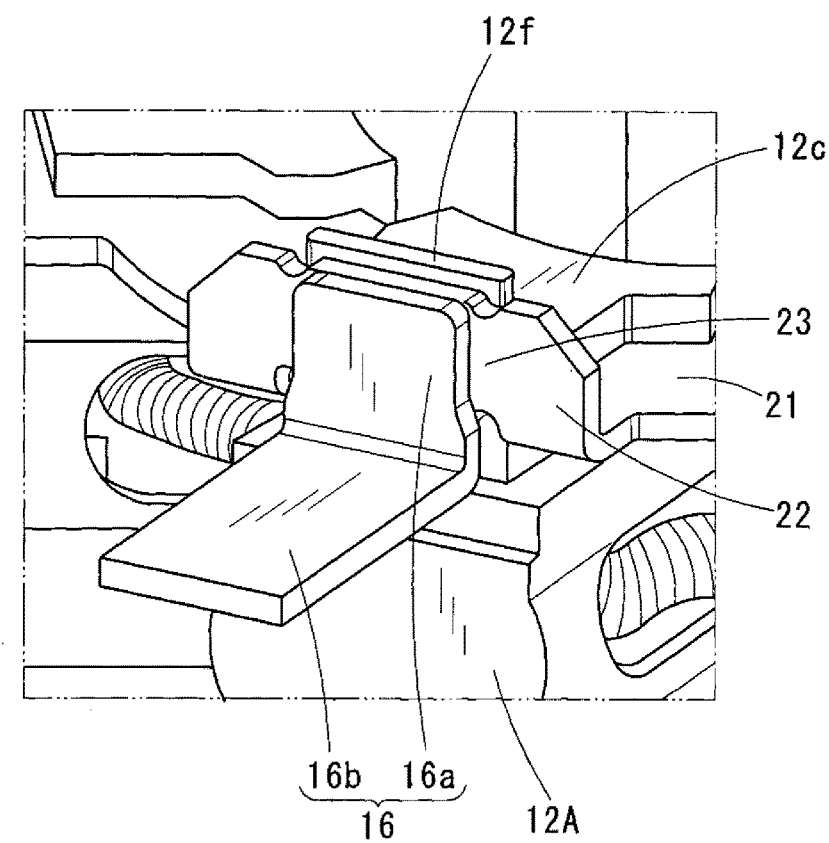
FIG. 9 is a perspective view showing junctions between a drawing member and a positive connection plate of the DC motor according to the third embodiment of the invention.

As shown in FIG. 9, the fusion part 23 is provided at both circumferential ends of the joint portion between the crossover part 22 and the junction part 16a. The specific brush holder 12A includes an inner projection 12f projecting to the core side from the outer circumferential end of the convex part 12c. The inner projection 12f is formed so as to axially overlap with the crossover part 22 which is higher in voltage than the fusion part 23. Preferably, the axial height of the inner projection 12f is slightly larger than the axial height of the crossover part 22 from the plate part 21. In this configuration, since the axial length of the junction part 16a can be made sufficiently large, the junction area with the crossover part 22 can be made sufficiently large to increase the reliability of the junction portion.

As shown in FIG. 8, the junction part 16a is bent to the core side (to the left side in FIG. 8) at the outside of the riser 9c connected with the armature coil 8c. Accordingly, since the connection part 16a can be prevented from interfering with the riser 9c, the space existing radially outside the riser 9c can be effectively used for disposing the junction part 16a. Further, the inner projection 12f provided in the specific brush holder 12A is disposed so as to axially overlap with the crossover part 22 which is higher in voltage than the fusion part 23. Accordingly even if a piece of conductive material enters the inside of the motor 2, the inner projection 12f can prevent the piece from contacting a part which is higher in voltage than the fusion part 23 in conjunction with the core side projection 24a provided in the grommet 24. Accordingly, if an unexpected large current occurs in the motor 2, the motor 2 can be protected because the fusion part 23 is fused immediately.

Fourth Embodiment

Figure 10:
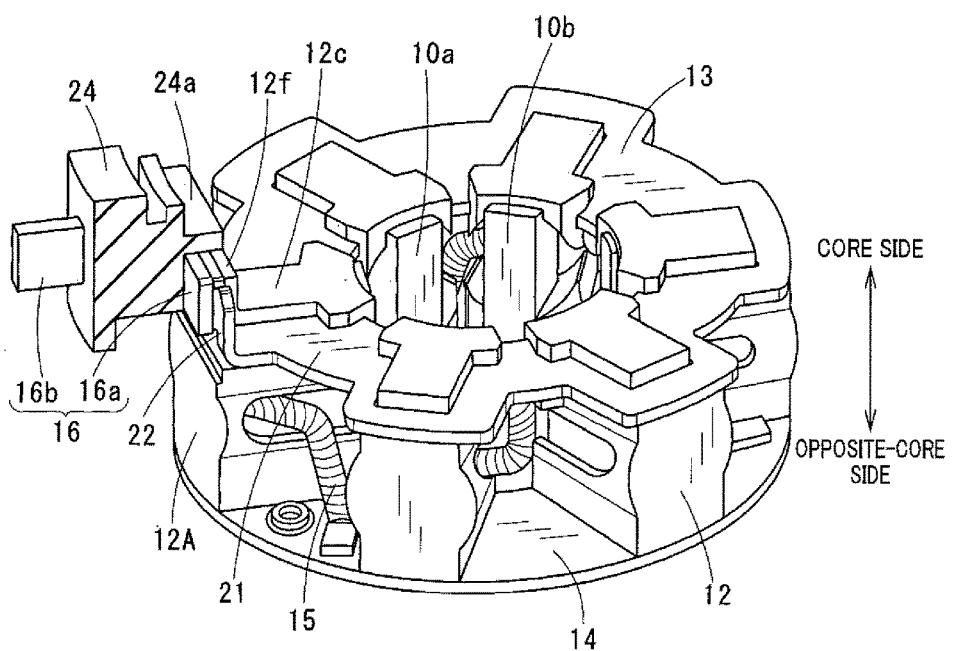
FIG. 10 is a perspective view of a brush assembly of a DC motor according to a fourth embodiment of the invention.
Figure 11:
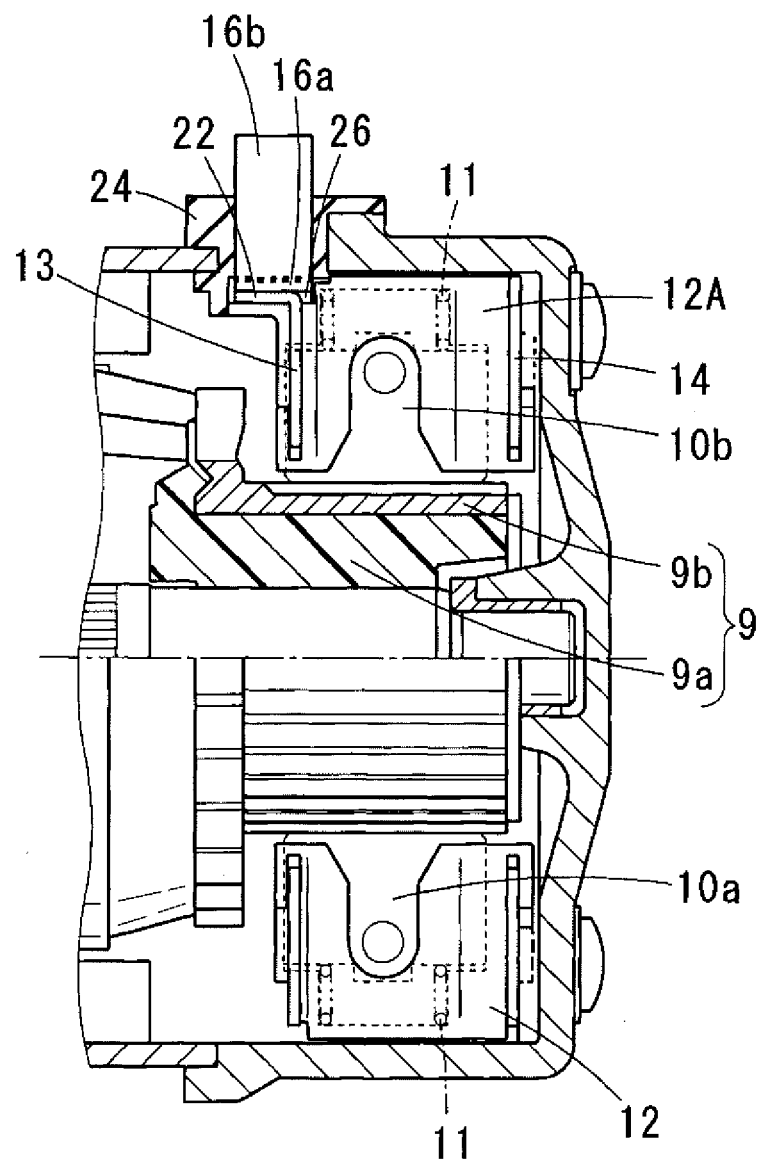
FIG. 11 is a cross-sectional view of a rear part of the DC motor according to the fourth embodiment of the invention.
Figure 12:
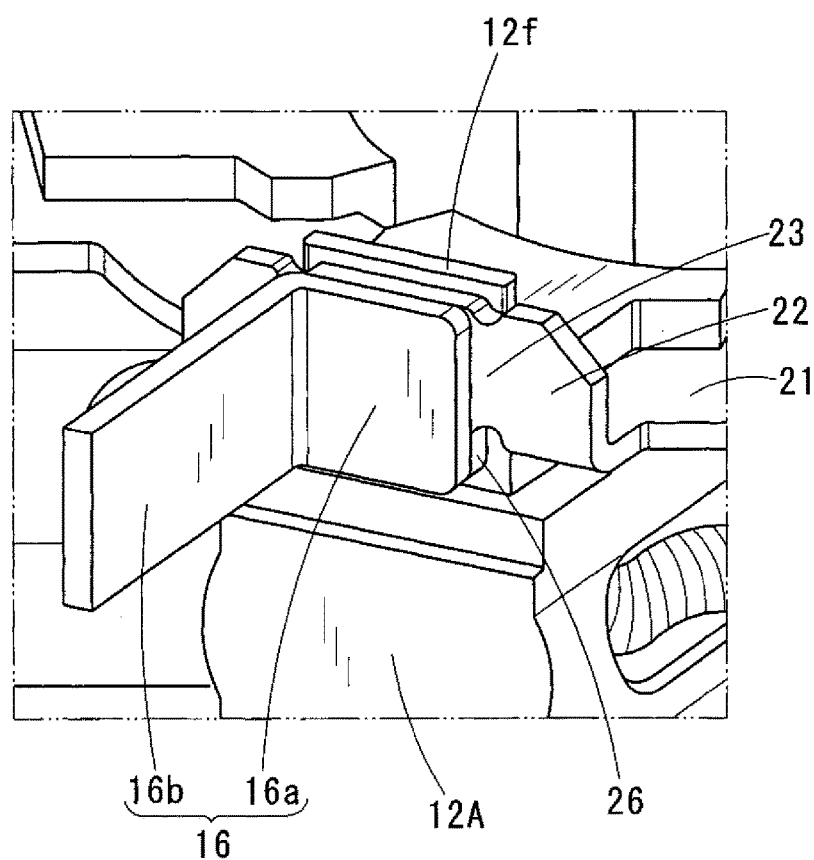
FIG. 12 is a perspective view showing junctions between a drawing member and a positive connection plate of the DC motor according to the fourth embodiment of the invention.

Next, a fourth embodiment of the invention is described. In the fourth embodiment, the crossover part 22 of the positive connection plate 13 is joined to the junction part 16a of the drawing member 16 such that they are radially opposed to each other as in the case of the third embodiment. The fourth embodiment differs from the third embodiment in the direction of the drawing member 16. As shown in FIGS. 10 and 12, in the fourth embodiment, the drawing member 16 is disposed such that both major surfaces of the plate-like drawing part 16b are perpendicular to the circumference of the commutator 9, and the junction part 16b is bent at substantially a right angle in the circumferential direction from the plate-like drawing part 16b and joined to the radially outer surface of the crossover part 22. As shown in FIGS. 11 and 12, the positive connection plate 13 may be provided with two fusion parts 23 formed in the crossover part 22, and provided with an extended plate, part 26 which axially overlaps with the stepped surface by extending a portion between the two fusion parts 23 to the opposite-core side. According to this configuration, since the axial width of the combination of the crossover part 22 and the axial width of the extended plate part 26 can be made the same as each other, the junction area can be made sufficiently large to increase the reliability of the junction portion.

Fifth Embodiment

Figure 13:
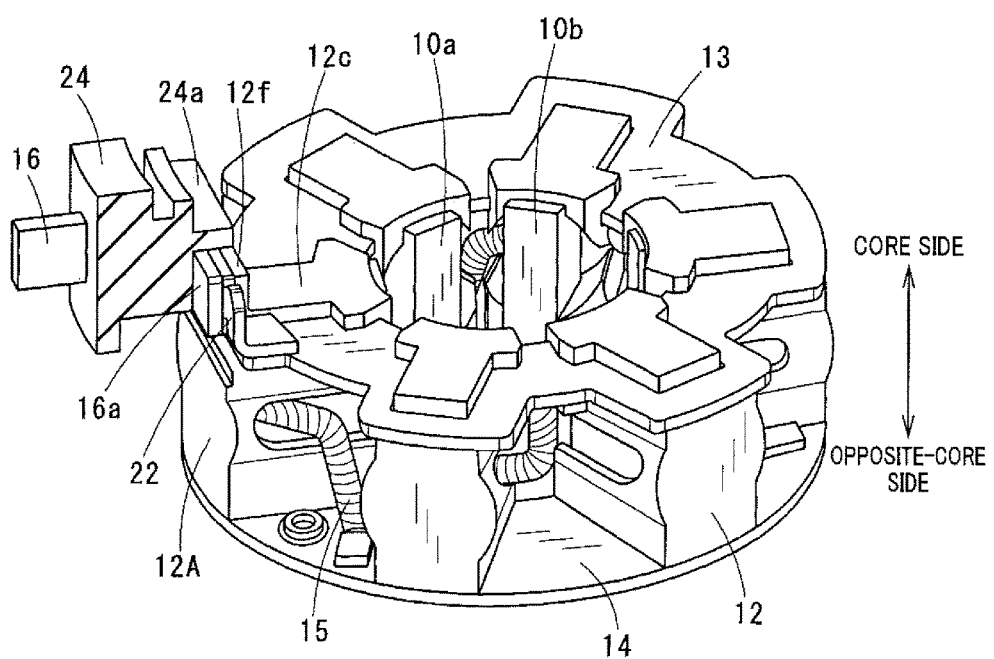
FIG. 13 is a perspective view of a brush assembly of a DC motor according to a fifth embodiment of the invention.
Figure 14:
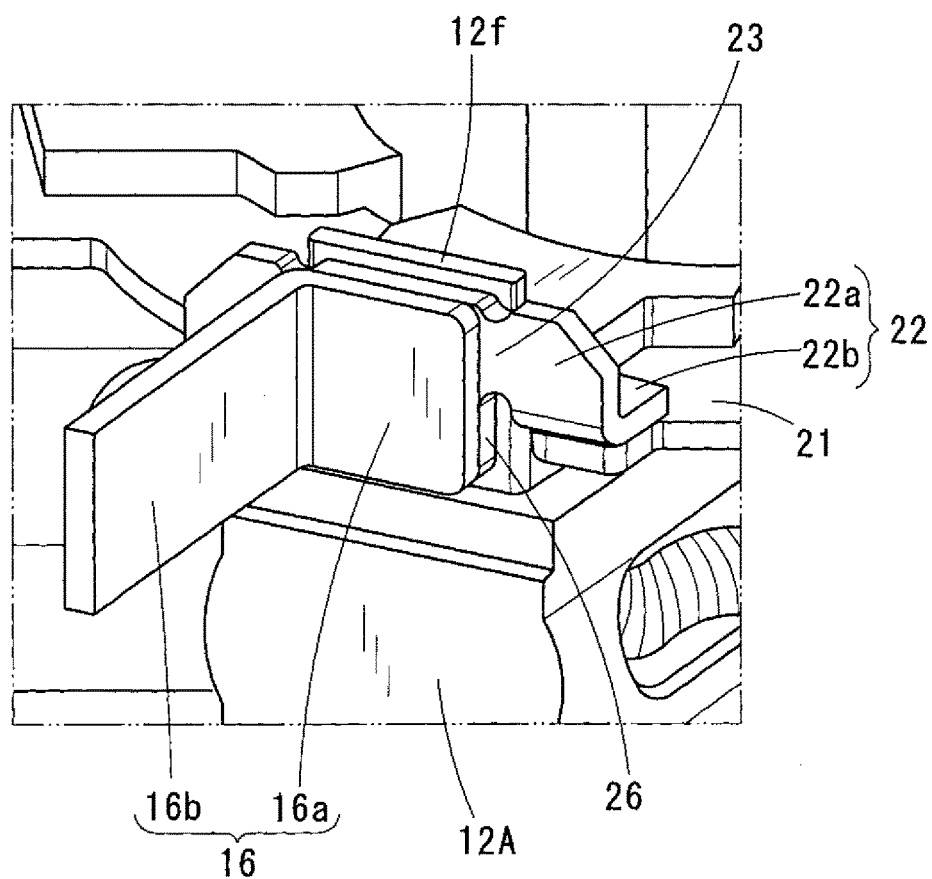
FIG. 14 is a perspective view showing junctions between a drawing member and a positive connection plate of the DC motor according to the fifth embodiment of the invention.

Next, a fifth embodiment of the invention is described. In FIG. 5, the crossover part 22 is provided separately from the positive connection plate 13 for the specific brush holder 12A. As shown in FIG. 13, in this embodiment, only the crossover part 22 disposed at a position that circumferentially overlaps with the specific brush holder 12A is provided separately from the positive connection plate 13, and joined to the plate part 21. As shown in FIG. 14, this separate crossover part 22 includes a main body part 22a formed with two fusion parts 23, a pair of leg parts 22b formed in both circumferential ends of the main body part 22a. The leg parts 22b are joined to the core side surface of the plate part 21. The main body part 22a is bent at substantially a right angle to the core side from the leg parts 22b. The extended plate-like part 26 described in the fourth embodiment may be provided integrally with the main body part 22a.

The drawing member 16 is disposed such that both major surfaces of the plate-like drawing part 16b are perpendicular to the circumference of the commutator 9, and the junction part 16a is bent at substantially a right angle in the circumferential direction from the plate-like drawing part 16b and joined to the main body part 22a of the crossover part 22 and the extended plate-like part 26. According to this configuration, since the junction area between the crossover part 22 and the junction part 16a can be made sufficiently large to increase the reliability of the junction portion. The drawing member 16 may be disposed such that both major surfaces of the plate-like drawing part 16b are perpendicular to the center axis of the commutator 9, and the junction part 16a is bent at substantially a right angle to the core side from the plate-like drawing part 16b.

Modifications

In the first embodiment, the brush spring 11 is housed in the specific brush holder 12A such that the axial center Os thereof is offset to the opposite-core side from the axial center Ob of the brush 10. However, the axial center Os of the brush spring 11 and the axial center Ob of the brush 10 may coincide with each other. In the first embodiment, the convex part 12c is inserted from the inner circumference of the positive connection plate 13 and fitted in the fitting groove 13a when the brush holder 12 is assembled to the positive connection plate 13. However, the convex part 12c may be inserted along the axial direction and press-fitted in the fitting groove 13a.

The above explained preferred embodiments are exemplary of the invention of the present application which is described solely by the claims appended below. It should be understood that modifications of the preferred embodiments may be made as would occur to one of skill in the art.

What is claimed is:

1. A DC motor comprising:
a cylindrical commutator mounted on a shaft of an armature;
brushes disposed on an outer circumference of the commutator;
brush springs disposed on an opposite-commutator side of the brushes for pressing the brushes toward the commutator;
brush holders holding the brushes at an inner side in a radial direction perpendicular to a center axis of the commutator and holding the brush springs at the opposite-commutator side of the brushes;
a positive connection plate made of conductive material and disposed at a core side of the commutator from the brush holders in an axial direction of the commutator, the positive connection plate being electrically connected with positive brushes of the brushes through pigtails;
a negative connection plate made of conductive material and disposed at an opposite-core side of the armature from the brush holders in the axial direction, the negative connection plate being electrically connected with negative brushes of the brushes through pigtails; and
a drawing member electrically connected to the positive connection plate at a first end part thereof as a junction part, a second end part of the drawing member being drawn to an outside of a motor case of the DC motor, wherein
one of the brush holders holding the negative brushes is a specific brush holder,
the positive connection plate includes a fitting groove to enable assembling the specific brush holder thereto,
the specific brush holder includes a convex part that fits in the fitting groove and a stepped surface having a step at a radially outer side of the convex part, and located at the opposite-core side from a core-side end surface of the convex part,
a space existing in an axial stepped area which is located at the core side from the stepped surface and in which the step is formed is a stepped space, and
the drawing member is drawn from a position which circumferentially overlaps with the specific brush holder to the outside of the motor case, and is disposed so as to overlap with the stepped space in the axial direction.

2. The DC motor according to claim 1, wherein
an axial length of the brush springs is smaller than an axial length of the brushes, and
the specific brush holder is formed such that the step is located at a position between the core-side end surface of the convex part and the stepped surface depending on an axial distance between a core-side axial end of the brush and a core-side axial end of the brush spring.

3. The DC motor according to claim 2, wherein the specific brush holder is formed such that an axial center of a spring housing chamber housing the brush spring is offset to the opposite-core side from an axial center of a brush housing chamber housing the brush.

4. The DC motor according to claim 1, wherein the specific brush holder is made of insulating material.

5. The DC motor according to claim 1, wherein resistance of material of the drawing member is lower than resistance of material of the positive connection plate.

6. The DC motor according to claim 1, wherein the positive connection plate includes plate parts disposed so as to be located at both circumferential ends of each of the fitting grooves, and crossover parts each connecting circumferentially adjacent two of the plate parts to each other,
one of the crossover parts being disposed in the stepped space,
the junction part being joined to the crossover part
a circumferential width of the junction part being larger than a circumferential width of the fitting groove.

7. The DC motor according to claim 6, wherein the positive connection plate is formed with a fusion part between a junction portion at which the junction part connects to the crossover part and a portion at which the crossover part connects to the plate part, a cross-sectional area of the positive connection plate being a minimum at the fusion part.

8. The DC motor according to claim 7, further comprising an insulating member for insulation between the drawing member and the motor case, the insulation member being fitted to the motor case so as to hold a circumference of the drawing member,
the insulating member including a core-side projection which projects radially inward of the motor case from a junction portion at which the crossover part is joined to the junction part and radially overlaps with a portion which is higher in voltage than the fusion part.

9. The DC motor according to claim 7, wherein the specific brush holder includes an inner projection that projects to the core side from an outer circumferential end of the convex part, and axially overlaps with a portion which is higher in voltage than the fusion part.

10. The DC motor according to claim 1, wherein
the commutator includes commutator segments arranged in a cylindrical form and insulated from one another, core-side ends of the commutator segments being connected with armature coils, and the positive connection plate includes plate parts disposed so as to be located at both circumferential ends of each the fitting grooves, and crossover parts each connecting circumferentially adjacent two of the plate parts to each other, the crossover part disposed at a position that circumferentially overlaps with the specific brush holder being bent to the core side from the plate part at circumferentially outward of a core-side end of the commutator segment, the drawing member being joined to a radially outer surface of the crossover part.

11. The DC motor according to claim 10, wherein
the drawing member is formed of a plate-like member,
the second end part of the drawing member is a plate-like drawing member,
the plate-like drawing member is disposed such that both major surfaces thereof are perpendicular to the axial center of the commutator, and
the junction part is bent towards the core side from the plate-like drawing member.

12. The DC motor according to claim 10, wherein
the drawing member is formed of a plate-like member,
the second end part of the drawing member is a plate-like drawing member,
the plate-like drawing member is disposed such that both major surfaces thereof are perpendicular to a circumferential direction of the commutator, and
the junction part is bent in the circumferential direction from the plate-like drawing member.

13. The DC motor according to claim 10, wherein the positive connection plate is formed with a fusion part between a junction portion at which the junction part connects the crossover part and a portion at which the crossover part is bent to the core side from the plate part, a cross-sectional area of the positive connection member being a minimum at the fusion part.

14. The DC motor according to claim 10, wherein the crossover part includes an extended plate part which extends to the opposite-core side and axially overlaps with the stepped space.

15. The DC motor according to claim 1, wherein
the commutator includes commutator segments arranged in a cylindrical form and insulated from one another, core-side ends of the commutator segments being connected with armature coils, and the positive connection plate includes plate parts disposed so as to be located at both circumferential ends of each of the fitting groove, and crossover parts each connecting circumferentially adjacent two of the plate parts to each other, the crossover part disposed at a position that circumferentially overlaps with the specific brush holder being provided separately from the positive connection plate and bent towards the core side from the plate part at circumferentially outward of a core-side end of the commutator segment, the drawing member being joined to a radially outer surface of the crossover part.

16. The DC motor according to claim 1, wherein a field pole member of the DC motor is comprised of permanent magnets.

* * * * *